United States Patent
Weissenmayer et al.

(10) Patent No.: US 10,897,376 B2
(45) Date of Patent: Jan. 19, 2021

(54) SUBSCRIBER STATION FOR A BUS SYSTEM AND METHOD FOR INCREASING THE DATA RATE OF A BUS SYSTEM

(71) Applicant: Robert Bosch GmbH, Stuttgart (DE)

(72) Inventors: Simon Weissenmayer, Flein (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 16/281,350

(22) Filed: Feb. 21, 2019

(65) Prior Publication Data
US 2019/0260607 A1    Aug. 22, 2019

(30) Foreign Application Priority Data
Feb. 21, 2018  (DE) .......................... 10 2018 202 615

(51) Int. Cl.
| | | |
|---|---|---|
| *G06F 13/36* | (2006.01) | |
| *H04L 12/40* | (2006.01) | |
| *G06F 13/40* | (2006.01) | |

(52) U.S. Cl.
CPC ...... *H04L 12/4013* (2013.01); *G06F 13/4063* (2013.01); *H04L 12/40071* (2013.01);
(Continued)

(58) Field of Classification Search
CPC . G06F 13/00; G06F 13/4063; H04L 12/4013; H04L 12/40071; H04L 2012/40215; H04L 2012/40273
(Continued)

(56) References Cited

U.S. PATENT DOCUMENTS

| | | | | |
|---|---|---|---|---|
| 2002/0091838 A1* | 7/2002 | Rupp | ................... | H04L 12/4013 709/227 |
| 2008/0186870 A1* | 8/2008 | Butts | ................... | H04L 43/0847 370/252 |

(Continued)

FOREIGN PATENT DOCUMENTS

| | | |
|---|---|---|
| DE | 102011081159 A1 | 2/2013 |
| DE | 102014202385 A1 | 8/2015 |
| EP | 2990290 A1 | 3/2016 |

OTHER PUBLICATIONS

International Standard "Road vehicles—controller area network (CAN)" Second Edition Dec. 15, 2015 ISO 11898-1.
(Continued)

*Primary Examiner* — Tim T Vo
*Assistant Examiner* — Kim T Huynh
(74) *Attorney, Agent, or Firm* — Norton Rose Fulbright US LLP; Gerard Messina (57) ABSTRACT

In a method for increasing the data rate of a bus system in which at least at times an exclusive, collision-free access of a subscriber station to a bus line of the bus system is ensured, a subscriber station for the bus system includes a communication control device for evaluating a message that was received by at least one further subscriber station of the bus system via the bus system, the communication control device including at least two RX protocol machines that are set up to use different bit timing parameter data sets in order to evaluate whether the received message is valid, the at least two RX protocol machines each being assigned a register to which the associated RX protocol machine is designed to write the result of its evaluation of the received message.

10 Claims, 4 Drawing Sheets

(52) U.S. Cl.
CPC ............... *H04L 2012/40215* (2013.01); *H04L 2012/40273* (2013.01)

(58) Field of Classification Search
USPC ................................................ 710/105, 315
See application file for complete search history.

(56) References Cited

U.S. PATENT DOCUMENTS

2014/0244105 A1    8/2014  Dariush et al.
2014/0330479 A1   11/2014  Dolgov et al.

OTHER PUBLICATIONS

Patrick Lin: "The Robot Car of Tomorrow May just be Programmed to Hit You" Jun. 5, 2014.

\* cited by examiner

SUBSCRIBER STATION FOR A BUS SYSTEM AND METHOD FOR INCREASING THE DATA RATE OF A BUS SYSTEM

CROSS-REFERENCE TO RELATED APPLICATIONS

The present application claims priority under 35 U.S.C. § 119 to DE 10 2018 202 615.7, filed in the Federal Republic of Germany on Feb. 21, 2018, the content of which is hereby incorporated by reference herein in its entirety.

FIELD OF THE INVENTION

The present invention relates to a subscriber station for a bus system and to a method for increasing the data rate of a bus system, in which a received bus signal is redundantly evaluated with different bit timing parameters in order to enable realization of a secure communication in the bus system with as high a transmission rate as possible even when there is distortion of a signal level, in particular relating to radiation relevant for electromagnetic compatibility (EMC).

BACKGROUND

For the transmission of information between subscriber stations of a bus system, the information is converted by the subscriber stations into a signal having different voltage states that can be transmitted between the subscriber stations serially or in parallel via a bus of the bus system. In particular, here a communication between sensors and control devices is conceivable, as takes place for example in a vehicle or in an industrial production facility, etc. As an example of a serial bus system, the CAN bus system, and its further developments such as TTCAN (Time Trigger CAN), CAN FD, etc., are in wide use.

In particular, CAN FD, which is described in ISO11898-1:2015 as a CAN protocol option, enables an increase of the data transmission rate in a data phase. In this way, the constantly increasing number of intelligent sensors and increasing networking of control devices in the vehicle, and thus the increasing number of subscriber stations at the CAN bus and the data traffic at the CAN bus, can be handled. In a CAN FD bus system, a data transmission rate of greater than 1 Mbit per second (1 Mbps) is possible, for example 2 Mbit/s, 5 Mbit/s, or any other data transmission rate greater than 1 Mbit/s, etc. In addition, a CAN-HS (HS=high speed) bus system is known in which a data transmission rate of up to 500 kbit per second (500 kbps) is known.

In standard bus topologies, which are intended to connect as many subscriber stations to one another as possible, CAN subscriber stations are connected to the bus by stub lines. A problem here is that reflections occur at each branch of the bus line during the data transmission. These reflections are superposed on the original signals and interfere with the reception at the receiver. The greater the reflections are, the slower the data rate has to be selected in order to be able to reliably transmit or receive the signal. Here, the shorter the line between the interference source and the receiver, and the longer the line between the transmitter and receiver, the worse the signal quality.

Another problem is that in the design of a CAN network or bus system, for each individual subscriber station, the times at which a bit is to be sampled are set. This setting is also called bit timing. Depending on which subscriber station receives the signal, different times are optimal for error-free reception. However, the times cannot be varied as a function of the transmitting subscriber station. Therefore, in the design of a CAN network or bus system, a compromise has to be found for the best times, taking into account all the subscriber stations. In particular in the design of a network having a plurality of CAN-FD subscribers, it is difficult to set the times in such a way that all subscribers can receive the signal without error. If new subscriber stations are later to be added to the bus system, it can happen that the compromise previously found for the best times is no longer the best compromise for the then resulting bus system. Ultimately, all this causes a reduction of the data rate in the bus system.

SUMMARY

An object of the present invention is to provide a subscriber station for a bus system and a method that solve the problems noted above. In particular, a subscriber station for a bus system and a method are to be provided with which a data transmission speed can be realized in the bus system that is as high as possible even when there is interference on the CAN bus, such as unfavorable EMC conditions or EMC radiation.

This object is achieved by a subscriber station for a bus system, the subscriber station including a communication control device for evaluating a message that was received by at least one further subscriber station of the bus system via the bus system, in which bus system at least at times an exclusive, collision-free access of a subscriber station to a bus line of the bus system is ensured, the communication control device having at least two RX protocol machines that are set up to use different bit timing parameter data sets in order to evaluate whether the received message is valid, each of the at least two RX protocol machines being assigned a register to which the associated RX protocol machine is designed to write the result of its evaluation of the received message.

With the subscriber station, the data transmission speed or data transmission rate can be increased compared to previous bus systems. This holds even if only one subscriber station of the bus system is realized as described above. However, the maximum increase can be reached if all subscriber stations of the bus system are designed as described above.

In addition, the design of the bus system is simplified because the settings of the parameters for a bit timing are automatically carried out during operation of the bus system. As a result, control devices, actuators, and sensors can on the one hand be used as subscriber stations in different buses without having to adjust the software for the bit timing or the correct baud rate upon commissioning. On the other hand, the automatic setting is very advantageous in applications in which more and more subscriber stations from different manufacturers are connected to the bus line over time. Moreover, the bit timing reacts to changes in the environmental conditions, such as temperature and/or humidity, etc., automatically, so that the optimal transmission rate in the bus system is possible under all conditions. As a result, it is no longer required to reduce the data rate of the bus if no suitable time point for error-free reception can be found.

Thus, the subscriber station is also suitable for use in higher-clocked systems, such as CAN-FD, etc. In addition, the described design of the subscriber station can also be supplemented as an additional function for already-existing subscriber stations designed for communication with an arbitrary CAN protocol. The above-described subscriber station is suitable for use by CAN-FD even in applications in which no further increase of the data rate was possible until now. Such applications include for example bus topologies in which CAN-FD was previously not usable due to line reflections. Here, it can be sufficient to design in the manner designed above only those subscriber stations that are affected particularly strongly by line reflections. However, the maximum benefit is gained if all subscriber stations of the bus system are designed in the manner described above.

The subscriber station can in addition have a comparator unit for comparing data of the registers, and in addition can have a receive memory for receiving valid data of one of the registers, if a test based on a message identifier included in the received message was successful, and for forwarding the valid data to an interface to a control device of the subscriber station.

According to an example embodiment, the communication control device is designed to hold available additional parameter data sets and associated error counters in addition to the bit timing parameter data sets that are assigned to the at least two RX protocol machines, the at least two RX protocol machines being designed to exchange their bit timing parameter data set for one of the additional parameter data sets as a function of the result of the evaluation of the received message, and to select the additional parameter data set on the basis of the value of the associated error counter.

In an example embodiment, the communication control device is designed to hold available a first bit timing parameter data set for a first phase in which all subscriber stations can transmit simultaneously to a bus line of the bus system, an to hold available a second bit timing parameter data set for a second phase in which an exclusive, collision-free access of a subscriber station to the bus line of the bus system is ensured.

According to an example embodiment, the communication control device is designed to replace errored pieces of data stored in a first register with valid pieces of data stored in a second register, the communication control device being designed to take over the bit timing parameter data set for the RX protocol machine assigned to the first register, which data set is used by the RX protocol machine that is assigned to the second register and that has received the valid pieces of data.

In an example embodiment, the communication control device is designed to wait until a valid message has been received before the first sending of a message.

According to an example embodiment, at least two communication control devices are provided that are connected to bus lines for two different bus systems, each communication control device having an RX protocol machine with an associated register to which the associated RX protocol machine writes the result of its evaluation of the received message, and the subscriber station having at least two additional RX protocol machines each having a register to which the associated RX protocol machine writes the result of its evaluation of the received message, the at least two additional RX protocol machines being optionally assignable to the RX protocol machines.

In an example embodiment, the communication control device is designed to check whether the received message is intended for the subscriber station or not, and, in the case of an error, to send an error message for the received message only if the test yields the result that the received message is intended for the subscriber station.

The subscriber station described above can be part of a bus system that has a bus line and at least two subscriber stations connected to one another via the bus line in such a way that they can communicate with each other. Here, at least one of the at least two subscriber stations is a subscriber station as described above.

According to an example embodiment, a method for increasing the data rate of a bus system includes evaluating, using a communication control device, a message that was received by at least one further subscriber station of the bus system, in which bus system at least at times an exclusive, collision-free access of a subscriber station to a bus line of the bus system is ensured, the communication control device having at least two RX protocol machines that use different bit timing parameter data sets in order to evaluate whether the received message is valid, and each of the at least two RX protocol machines being assigned a register to which the associated RX protocol machine writes the result of its evaluation of the received message. The method offers the same advantages as those mentioned above in relation to the subscriber station.

Further possible implementations of the present invention also include combinations not explicitly named of features or example embodiments described above or in the following in relation to the example embodiments. Here, the person skilled in the art will also understand individual aspects to the respective basic form of the present invention as improvements or supplementation.

In the following, the present invention is described in more detail on the basis of example embodiments with reference to the accompanying drawing in which identical or functionally identical elements have been provided with the same reference characters, unless otherwise indicated.

DETAILED DESCRIPTION

Figure 1:
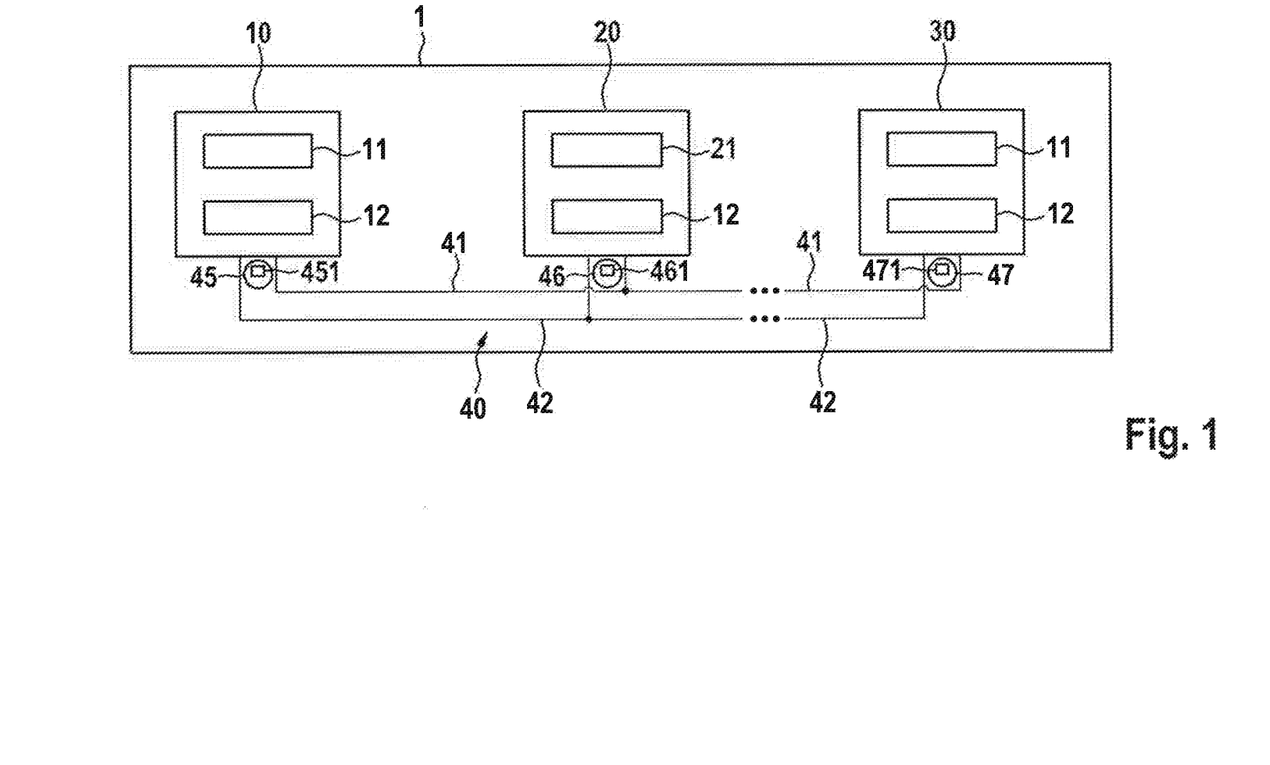
FIG. 1 shows a simplified schematic diagram of a bus system according to an example embodiment of the present invention.

FIG. 1 shows a bus system 1 that can be for example a serial bus system, in particular a CAN bus system, a CAN-FD bus system, etc. Bus system 1 can be used in a vehicle, in particular a motor vehicle, an aircraft, etc., or in a production facility, in a hospital, etc. Even though, in the following, the present invention is explained on the basis of the CAN bus system, this is not limiting. Instead, the principle of the present invention can be used with some other serial bus system.

In FIG. 1, bus system 1 has at least two subscriber stations 10, 20, 30, each connected to a bus line 40 having two bus leads 41, 42. Subscriber stations 10, 20, 30 are for example control devices, display devices, or sensors or actuators of a motor vehicle. Via bus line 40, messages 45, 46, 47 can be transmitted between the individual subscriber stations 10, 20, 30 in the form of signals. Messages 45, 46, 47 each has one of the message identifiers 451, 461, 471, which in CAN bus systems can also be called CAN-ID. The message identifier 451, 461, 471 unambiguously identifies the subscriber station that sent the associated message 45, 46, 47.

As shown in FIG. 1, subscriber station 10 has a communication control device 11 and a transceiver device 12. Subscriber station 20 has, in contrast, a communication control device 21 and a transceiver device 12. Like subscriber station 10, subscriber station 30 has a communication control device 11 and a transceiver device 12. Transceiver devices 12 of subscriber stations 10, 20, 30 are each connected directly to bus line 40, although this is shown only in FIG. 2.

Communication control device 11 of FIG. 1 is used to control a communication of the respective subscriber station 10, 20, 30 via bus line 40 with another subscriber station of the subscriber stations 10, 20, 30 connected to bus line 40. With regard to its transmit functionality, communication control device 11 can be realized as a conventional CAN controller. Transceiver device 12 can be realized as a conventional CAN transceiver. Subscriber station 20 corresponds, with regard to both its transmit and its receive functionality, to a conventional CAN subscriber station.

In a CAN bus system, a plurality of subscriber stations 10, 20, 30 can at times simultaneously send out messages 45, 46, 47 having message identifiers 451, 461, 471. These message identifiers 451, 461, 471 are used for arbitration in the arbitration phase. After the arbitration, there follows a data phase in which only one of the subscriber stations 10, 20, 30 sends signals to bus line 40 in the form of one or more of the messages 45, 46, 47. This one of the subscriber stations 10, 20, 30 has to send message 45, 46, 47 with the highest priority, and has therefore won the arbitration. From this moment, each listening subscriber station 10, 20, 30 can watch for and receive bus signals or messages 45, 46, 47. In this phase of the communication, also called the data phase, the data that are actually to be transmitted between subscriber stations 10, 20, 30 are sent.

Figure 2:
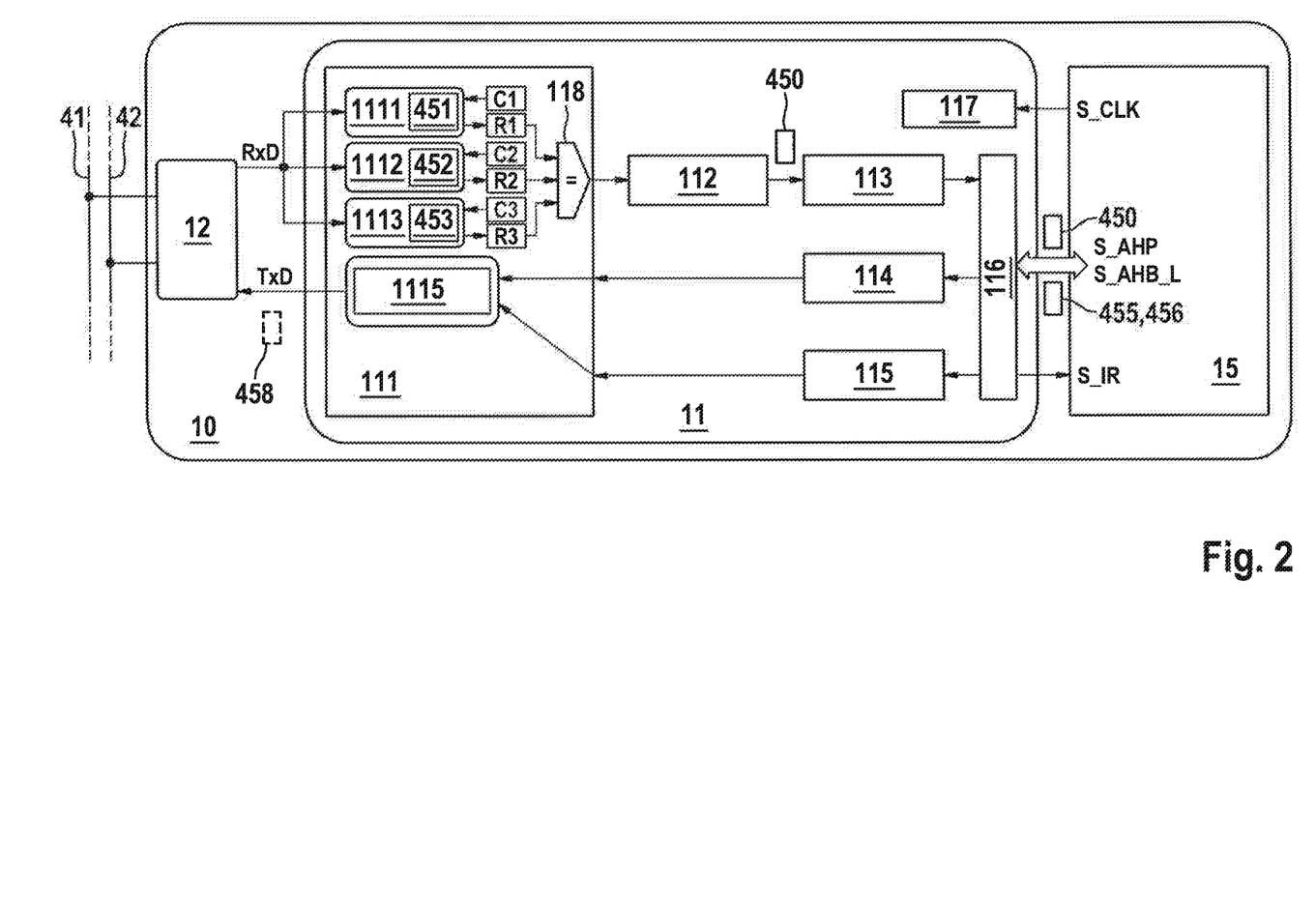
FIG. 2 shows a schema explaining a bit timing in relation to a bit time in the bus system according to an example embodiment of the present invention.

According to FIG. 2, for this purpose subscriber station 10 is designed in such a way that transceiver device 12 receives signals from bus leads 41, 42. In a CAN bus system, these signals are designated CAN_H and CAN_L, and form, on bus leads 41, 42, a differential voltage VDIFF=CAN_H–CAN_L as bus signal, as is known. From the analog signals CAN_H and CAN_L, transceiver device 12 forms a digital receive signal RxD and sends it to communication control device 11. If subscriber station 10 is active as sender, communication control device 11 sends a digital transmit signal TxD to transceiver device 12. Depending on the received receive signal RxD, transmit signal TxD is an error message 458, as described in more detail below. From digital transmit signal TxD, transceiver device 12 forms analog signals CAN_H and CAN_L, and sends these to bus leads 41, 42, as is known.

As FIG. 2 shows, communication control device 11 of subscriber station 10 has for this purpose, inter alia, a bus system protocol machine 111, an acceptance filter 112, a receive buffer 113 for storing received data 450 assessed as valid, a primary transmit memory 114 for storing data 455 to be transmitted with high priority, a secondary transmit memory 115 for storing data 456 to be transmitted with low priority, and an interface 116 to a control device 15 of subscriber station 10 that for example is a sensor or an actuator or an electronic control unit and that produces data 455, 456 to be transmitted or further processes the valid received data 450. Via interface 116, communication control device 11 and control device 15 exchange signals S_AHP or S_AHB_L and communication control device 11 can send an interrupt signal S_IR to control device 15. Moreover, communication control device 11 has a prescaler 117 that, using a whole-number divisor, divides a clock signal S_CLK from control device 15 down to a signal having a lower frequency for communication control device 11.

Differing from a conventional communication control device, communication control device 11 of FIG. 2 has at least two RX protocol machines, namely, in the present example, a first RX protocol machine 1111, a second RX protocol machine 1112, and a third RX protocol machine 1113, each of which receives receive signal RxD as data 451, 452, 453. Moreover, a comparator unit 118 is provided that is connected downstream from RX protocol machines 1111-1113. In addition, communication control device 11 has, as is standard, a TX protocol machine 1115 that produces transmit signal TxD and sends it to transceiver device 12.

First RX protocol machine 1111 evaluates receive signal RxD on the basis of bit timing parameters of a first bit timing parameter data set C1 of a bit time t_B, from which data 451 result. Bit time t_B is the temporal length of an individual bit of digital receive signal RxD and is described more precisely below in connection with FIG. 3 and associated bit timing parameters. The result of the evaluation is written to a first register R1 by first RX protocol machine 1111.

Second RX protocol machine 1112 evaluates receive signal RxD on the basis of bit timing parameters of a second bit timing parameter data set C2 of bit time t_B, resulting in data 452. The result of the evaluation is written by second RX protocol machine 1112 to a second register R2.

Third RX protocol machine 1113 evaluates receive signal RxD on the basis of bit timing parameters of a third bit timing parameter data set C3 of bit time t_B, resulting in data 453. Third RX protocol machine 1113 writes the result of the evaluation to a third register R3.

The at least two RX protocol machines 1111-1113 operate simultaneously during the reception of digital receive signal RxD, but with different settings, namely bit timing parameter data sets C1-C3 in the present example, and write the received data 451 first to separate registers R1-R3. Comparator unit 118 compares data 451-453 with each other. This is described in more detail below.

Figure 3:
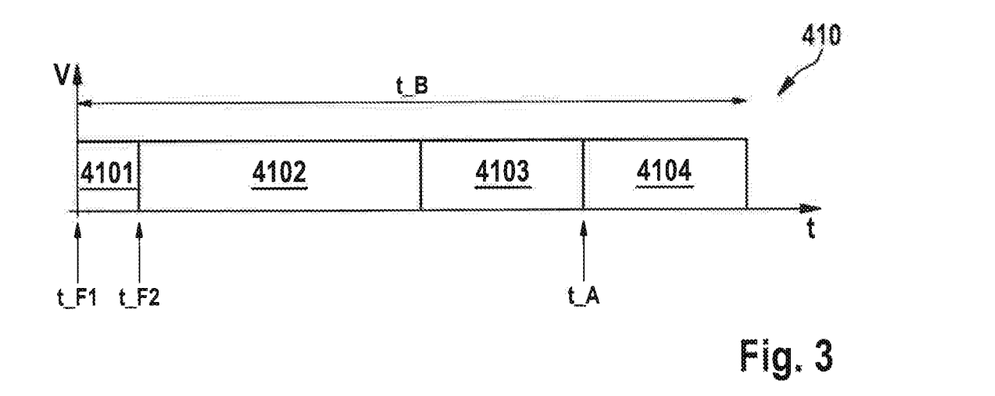
FIG. 3 shows a simplified schematic diagram explaining the design of a subscriber station according to an example embodiment of the present invention.

FIG. 3 illustrates the bit timing parameters of bit time t_B for an individual bit 410 in more detail. At the beginning of bit 410, or at the beginning of bit time t_B, there is situated a sync segment 4101 at the beginning of which an edge recognition takes place, at time t_F1, and at the end of which an edge recognition takes place at time t_F2.

In addition, following sync segment 4101, individual bit 410 has a signal propagation segment 4102, followed by two successive phase segments 4103, 4104. Between first phase segment 4103 and second phase segment 4104 there is situated a sampling time t_A at which the voltage state or voltage level of bit 410 is sampled. Depending on the length of the two phase segments 4103, 4104—different lengths or time durations of phase segments 4103, 4104 also being possible—sampling time t_A can be shifted within bit time t_B. The length or time duration of signal propagation segment 4102 is a function in each case of the topology of bus line 40, the number of subscriber stations 10, 20, 30, the spatial distance between the individual subscriber stations 10, 20, 30, the number and length of the stub lines for connecting subscriber stations 10, 20, 30 to bus line 40, etc.

If the edges of bit 410 are distorted by EMC radiation, it can occur that bit 410 is lost during reception or cannot be acquired. Moreover, an error can occur if bit 410 is sampled at an unfavorable sampling time t_A. Generally, EMC radiation can distort the level of bit 410 so strongly that, even given sampling at an optimal sampling time t_A, an errored bit 410 is received, while bit 410 can be received without error if sampling takes place shortly before or shortly after the optimal sampling time t_A.

Therefore, sampling time t_A is the main element to be varied. For this purpose, a freely selectable combination of the following selectable parameters is defined for each of the various bit timing parameter data sets C1-C3, it being possible that the various bit timing parameter data sets C1-C3 differ only in at least one of the parameters named below. Primarily, these are the bit timing parameters, which are described in ISO11898-1:2015:

a. Prescaler m
b. Prop_Seg
c. Phase_Seg1
d. Phase_Seg2
e. SJW

A variation of these parameters implicitly also enables the bit rates to be varied.

Thus, if one of the RX protocol machines 1111-1113 of FIG. 2 receives implausible data from receive signal RxD, which is based on a message 45, for example data 451 of machine 1111, then, using comparator unit 118 and acceptance filter 112, it is checked whether one of the other RX protocol machines 1112, 1113 can receive plausible data from receive signal RxD.

By evaluating a checksum (CRC sum) at the end of data 451-453, comparator unit 118 decides whether the reception was correct. The reception was correct if the evaluation of the checksum (CRC sum) at the end of data 451-453 provides a valid result (CRC=OK). Otherwise, the reception was not correct. At the end of message 45, communication control device 11 always reports back to bus 40, with an acknowledge bit, as to whether the reception was correct or not.

As long as one of the RX protocol machines 1111-1113 can receive valid or plausible data from receive signal RxD, comparator unit 118 decides that the reception will be continued even if individual RX protocol machines 1111-1113 receive errored data. If all other RX protocol machines 1111-1113 receive no plausible data from receive signal RxD, then the reception is aborted by an error message 458.

If, after the reception, at least two registers of registers R1-R3 contain data 451, 452, 453 that are valid or plausible, but different from one another, then the content of message 45 is discarded and an error message 458 is sent as transmit signal TxD. This can take place as follows. If at least two of the RX protocol machines 1111-1113 receive different but valid data 451-453 at different times, the acknowledge bit can be sent as soon as the first RX protocol machine, for example RX protocol machine 1112, arrives at a valid result after the evaluation of the checksum. If, as the process continues, additional RX protocol machines also receive valid but different data 451, 452, 453 of messages 45, then communication control device 11 sends an error message 458 instead of another acknowledge bit.

As an alternative to the above procedure of communication control device 11, in which an error message 458 is sent instead of a further acknowledge bit, the procedure can even more advantageously be as follows. If communication control device 11 has sent an acknowledge bit once, then no further action is permitted to be taken based on the receive result of the other RX protocol machines. That is, communication control device 11 is permitted neither to send an error message 458 based on the receive result of the other RX protocol machines, nor to send a further acknowledge bit. In this case, the other RX protocol machines can simply abort their operation in connection with the reception of the current message 45, and wait for the next message.

If one of the registers R1-R3 contains valid data 451, 452, 453, or if at least two of the registers R1-R3 contain valid data 451, 452, 453 that agree with each other, then these are written to receive buffer 113 as data 450, if a check of the ID, or of message identifier 451, of message 45 by acceptance filter 112 was successful. The check by acceptance filter 112 is successful if data 450 are relevant for control device 15.

The acceptance filtering carried out by acceptance filter 112 thus decides whether or not a message 45, or its data 451, are stored in receive memory 113 as data 450.

Thus, for various configurations of bus system 1, subscriber stations 10, 30 can receive valid data 450 from the RxD receive signal. In this way, the data rate of bus system 1 can be increased compared to a conventional bus system. In this way, subscriber stations 10, 30 carry out a method for increasing the data rate of bus system 1.

According to a modification of the example embodiment described above, the case is taken into account in which subscriber station 10, in particular a sensor, etc., is to be used in many different bus systems 1 that have different overall lengths, clock frequencies, and numbers of subscriber stations. In this case, it is advantageous to proceed as follows. After the initial operation of subscriber station 10 in bus system 1, subscriber station 10 waits to first send a message 45 until subscriber station 10 is able to receive a valid message 45 or valid data 450. As soon as this has successfully taken place, subscriber station 10 can ascertain, from the associated data set C1-C3, the baud rates with which operation is taking place in bus system 1. Only starting from this time does subscriber station 10 send its data, with the baud rates used in the bus. In this way, subscriber station 10 can be used in bus systems 1 having any configuration, without software modification.

According to a further modification of the example embodiment described above, communication control device 11 can be informed, by an additional item of information in receive registers R1-R3, as to how many RX protocol machines 1111-1113 have received message 45 without error. Communication control device 11, in particular its software, can then decide whether the number of error-free evaluations is sufficient and/or whether the received information or data 450 is/are trustworthy enough, and/or whether the signal quality is adequate to allow this to be used in safety-relevant decisions, or to abort the signal transmission through an error message 458, and/or to repeat it. If desired, the signal transmission can be better secured with the lower protocol layers than has been possible up to now. Such a procedure is advantageous if particular value is placed on avoiding failure to notice errored reception of messages 45, 46, 47. This is the case for example if data 450 are not to be secured by higher protocol layers.

Figure 4:
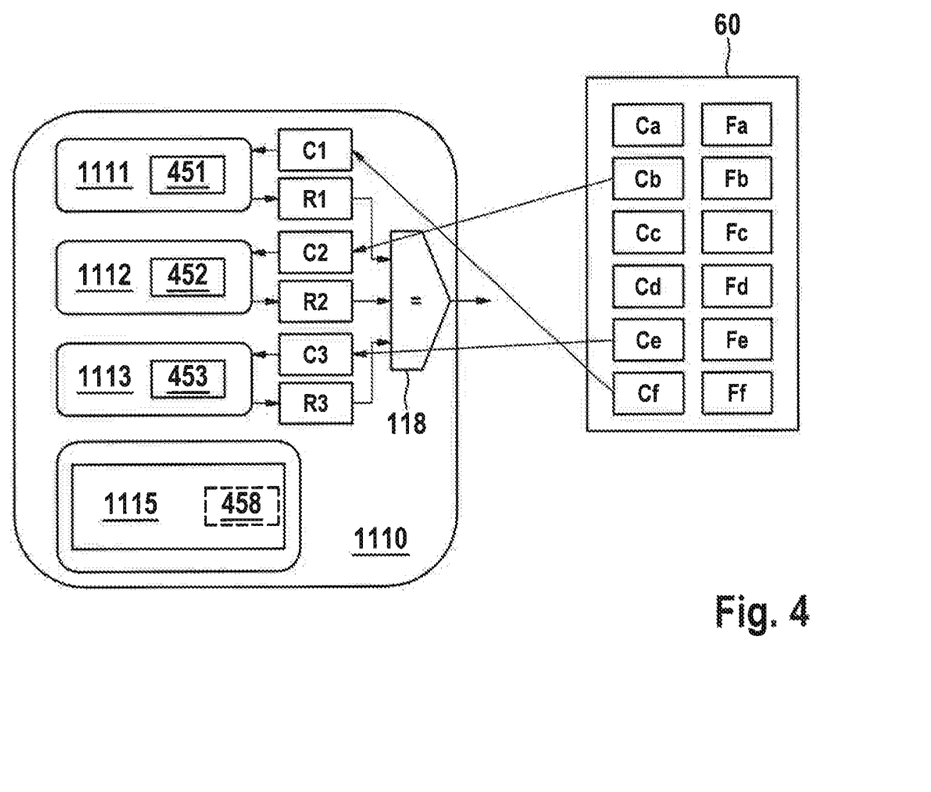
FIG. 4 shows a simplified schematic diagram explaining the design of a bus system protocol machine according to an example embodiment of the present invention.

FIG. 4 shows a bus system protocol machine 1110 according to an example embodiment. Bus system protocol machine 1110 according to this example can be used in at least one of the subscriber stations 10, 30 instead of bus system protocol machine 111 described above. In addition or alternatively, bus system protocol machine 1110 according to the present example embodiment can be used in subscriber stations 20. Except for the differences described below, bus system 1 is realized in the same way as described above in relation to the first example embodiment and/or modifications thereof.

In bus system protocol machine 1110 according to the present example embodiment, the optimal bit timing parameters for parameter data set C1-C3 can be learned adaptively, as follows. For this purpose, more bit timing configurations Ca, Cb, Cc, Cd, Ce, Cf are stored in a table 60 than the number of available RX protocol machines 1111-1113. Table 60 can be provided in a data file or in a database. Moreover, for each bit timing configuration Ca, Cb, Cc, Cd, Ce, Cf there is an error counter Fa, Fb, Fc, Fd, Fe.

Whenever one of the RX protocol machines 1111-1113 has received a message 45 with an error, but one of the other RX protocol machines 1111-1113 was able to receive message 45 without error, then, after the unsuccessful reception, RX protocol machine 1111-1113 selects as bit timing parameter data set C1-C3 a bit timing configuration Ca, Cb, Cc, Cd, Ce, Cf that was not already selected by any of the other RX protocol machines 1111-1113 and whose error counter Fa, Fb, Fc, Fd, Fe has the lowest value.

If for example RX protocol machine 1111 having configuration Cf receives a message 45 with an error, whereas RX protocol machine 1112 having configuration Cb receives message 45 without error, then RX protocol machine 1111 selects the new configuration Cd, because error counter Fd has the lowest value of all the configurations remaining for selection. In addition, the value of error counter Ff is increased by 10 points, and the value of error counter Fb is lowered by one point.

If all, or none, of RX protocol machines 1111-1113 receive message 45 without error, then the error counter values of error counters Fa, Fb, Fc, Fd, Fe remain the same.

If none of the RX protocol machines 1111-1113 are able to receive message 45 without error, then the RX protocol machine 1111-1113 that is using the configuration having the highest error counter value successively tries all other configurations Ca, Cb, Cc, Cd, Ce, Cf having equal or higher error counter values in error counters Fa, Fb, Fc, Fd, Fe, while all other RX protocol machines 1111-1113 keep the configurations Ca, Cb, Cc, Cd, Ce, Cf having the lowest error counter values.

In this way, the bus system protocol machine 1110 according to the present example embodiment can also be adapted to changed bus operating conditions. In this way, changes in the environmental conditions, such as temperature and/or air humidity, etc., can be compensated. This is because bus system protocol machine 1110 automatically reacts with a changed bit timing on the basis of parameter data set C1-C3 in such a way that bit timing configuration Ca, Cb, Cc, Cd, Ce, Cf is selected in such a way that the optimal transmission rate is possible under all conditions.

In addition, control devices 15, such as control units or actuators or sensors, etc., in different buses can be used without having to adapt the software for the bit timing or the correct baud rate, because the optimal bit timing and the correct baud rate are set automatically during running operation through the selection of the optimal parameter data set C1-C3, Ca, Cb, Cc, Cd, Ce, Cf. In this way, bus system protocol machines 1110 become substantially lower in cost, and thus cost-effective even in the lowest piece counts.

According to a modification of the example embodiment described above, in addition to the embodiment described above different bit timing parameter sets C1-C3, Ca, Cb, Cc, Cd, Ce, Cf having their own error counters F1, F2, F3, Fa, Fb, Fc, Fd, Fe can be held available for the arbitration and data phase of a message 45. The different bit timing parameter sets C1-C3, Ca, Cb, Cc, Cd, Ce, Cf having their own error counters F1, F2, F3, Fa, Fb, Fc, Fd, Fe can each be assigned to the respectively present RX protocol machines 1111-1113 independently of one another, according to the method described above.

Figure 5:
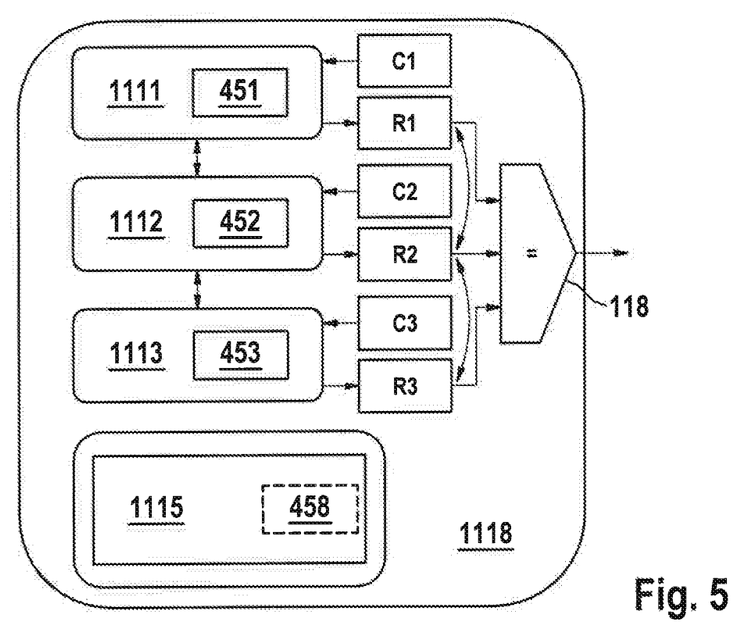
FIG. 5 shows a simplified schematic diagram explaining the design of a bus system protocol machine according to an example embodiment of the present invention.

FIG. 5 shows a bus system protocol machine 1118 according to an example embodiment. Bus system protocol machine 1118 according to this example embodiment can be used in at least one of the subscriber stations 10, 30 instead of one of the bus system protocol machines 111, 1110 according to one of the preceding example embodiments. In addition or alternatively, bus system protocol machine 1118 according to the present example embodiment can be used in subscriber station 20. Except for the differences described below, bus system 1 is realized in the same way as described above in relation to the first example embodiment and/or modifications thereof.

In bus system protocol machine 1118 according to the present example embodiment, if, during reception, implausible or errored data 451, or only pieces thereof, are stored in one of the registers R1-R3, but data 452, or only pieces of data, that are recognized as plausible or as not having errors are stored in at least one of the other registers R1-R3, the errored data 452, or only pieces of data, are replaced by the plausible data 452 or pieces of data. Moreover, the current bit timing parameter set C1-C3, with which the valid data 452 or pieces of data can be received, is taken over by the evaluation. The exchange of the current bit timing parameter set C1-C3 is to be understood as meaning that what is exchanged is the time step in which the last edge of a bit 410 was recognized, in order to enable correct determination of sampling time t_A.

The procedure offers an advantage if, during the transmission of a message 45, first only reception with, for example, bit timing parameter set C2 is successful, subsequently only reception with the other bit timing parameter set C3 is successful. If data 451, or pieces of data, have to be corrected by one of the RX protocol machines 1111-1113, while data 452 or pieces of data do not have to be corrected by other RX protocol machines 1111-1113, then only the error counters F1, F2, F3, Fa, Fb, Fc, Fd, Fe are increased of the RX protocol machines 1111-1113 in which the corrections were necessary. In contrast, the error counters F1, F2, F3, Fa, Fb, Fc, Fd, Fe of the other RX protocol machines 1111-1113 are reduced, as described above in relation to FIG. 4.

In this way, disturbances in bus system 1 can be even better compensated or corrected. In this way, a still greater increase of the data transmission speed in bus system 1 is possible.

Figure 6:
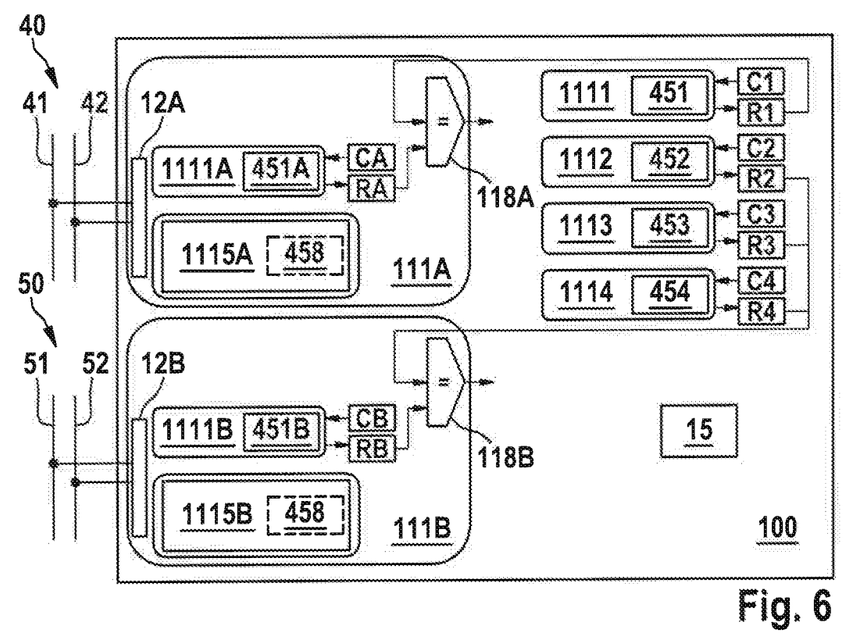
FIG. 6 shows a simplified schematic diagram explaining the design of a system of bus system protocol machines according to an example embodiment of the present invention.

FIG. 6 shows a system of two bus system protocol machines 111A, 111B according to an example embodiment. The system stands for the case in which a subscriber station 100 has a plurality of bus system protocol machines 111A, 111B, so that its control device 15 can be connected to bus lines 40, 50 of a plurality of buses. Bus line 50 also has a first and second bus lead 51, 52. In part, better receive properties are necessary for the different buses or bus lines 40, 50. In part, however, receive properties that are not as good are adequate. The higher the demands that are placed on the receive quality, the more RX protocol machines 1111-1114 having parameter data sets or bit timing parameter data sets C1-C4 and registers R1-R4 for receiving data 451-454 are to be connected to this bus or bus line 40. For this reason, it is also advantageous if a respective RX protocol machine 1111A for receiving data 451A and a TX protocol machine 1115A are always fixedly assigned to a respective bus, but the additional RX protocol machines 1111-1114, together with the associated configuration settings or data sets C1-C4 and receive registers R1-R4 for receiving data 451B, can however be assigned variably to the individual buses or bus lines 40, 50.

In the example of FIG. 6, in part better receive properties are necessary for the bus or bus line 50 because RX protocol machines 1112, 1113, 1114 are in addition assigned thereto, whereas only RX protocol machine 1111 is additionally assigned to the bus or bus line 40. However, a different assignment of RX protocol machines 1111-1114 is possible.

The number of additional RX protocol machines 1111-1114 to be selected can be specified in the design of the system. However, it is alternatively conceivable that the assignment at least of a certain number of RX protocol machines 1111-1114 takes place variably during operation. It is advantageous to assign more RX protocol machines 1111-1114 to a bus the more errored messages 45, 46, 47 are received in bus system 1.

Thus, with all the example embodiments and/or modifications thereof described above, the data transmission rate in bus system 1 can be increased. As long as only one of the subscriber stations 10, 20, 30 operates with the described method according to at least one of the example embodiments and/or modifications thereof described above, only a slight increase in the data rate is possible. However, as soon as all subscriber stations 10, 20, 30 use the described method according to at least one of the example embodiments and/or modifications thereof described above, the full potential can be exploited.

Moreover, the full potential for increasing the data transmission rate in bus system 1 can be exploited if only one of the subscriber stations 10, 20, 30 operates with the described method according to at least one of the example embodiments and/or modifications thereof described above, but the remaining subscriber stations 10, 20, 30 do not send any error messages 458 via bus line 40 in the case of messages 45, 46, 47 not intended for these subscriber stations 10, 20, 30. For this purpose, the remaining subscriber stations 10, 20, 30 can for example store a list in which the message identifiers 451, 461, 471 are stored of subscriber stations 10, 20, 30 of which the other subscriber stations 10, 20, 30 do not process any data.

Alternatively, the remaining subscriber stations 10, 20, 30 can also completely switch off the error handling.

In this way, signals that can be correctly received by particular receivers are prevented from being destroyed by subscriber stations that are not participating in the data transmission. In this way, a broader use of CAN-FD and a higher maximum data rate on a CAN bus are achieved than were previously the case.

All embodiments described above of bus system 1 of subscriber stations 10, 20, 30 and of the method according to the example embodiments and the modifications thereof can be used individually or in all possible combinations. In addition, in particular the following modifications are conceivable.

Bus system 1 described above according to the example embodiments and modifications thereof is described on the basis of a bus system based on the CAN protocol. Bus system 1 according to the example embodiments and modifications thereof can however also be a different type of communication network. It is advantageous, though not a necessary precondition, that in bus system 1, at least for particular time spans, an exclusive, collision-free access of a subscriber station 10, 20, 30 to bus line 40, or to a common channel of bus line 40, is ensured.

Bus system 1 according to the described example embodiments is in particular a CAN network or a CAN FD network or a LIN network or a FlexRay network.

The number and configuration of subscriber stations 10, 20, 30, 100 in bus systems 1 according to the example embodiments and modifications thereof is arbitrary. In particular, it is also possible for only subscriber stations 10 or subscriber stations 30 or subscriber stations 100 to be present in bus systems 1 of the example embodiments and the modifications thereof.

In order to achieve a still higher data rate, within the CAN framework of messages 45, 46, 47, the data transmission, for example in the data phase, can take place analogously to other serial data transmission protocols such as Ethernet, etc. The functionality of the example embodiments described above can be realized in a chipset of a communication control device 11. In addition or alternatively, it can be integrated into existing products. In particular, it is possible for the functionality under consideration to be embedded either in communication control device 11 as a separate electronic component (chip) or in an integrated overall solution in which only one electronic component (chip) is present.

What is claimed is:

1. A subscriber station for a bus system in which at least at times an exclusive, collision-free subscriber station access to a bus line of the bus system is ensured, the sub scriber station comprising:
 a communication control device that includes at least two RX protocol machines that are configured to:
  for a same message that was received by the subscriber station via the bus system and from at least one additional subscriber station of the bus system, use different respective bit timing parameter data sets to extract data of the message; and
  write a respective result of the extraction by the respective RX protocol machine to a respective register assigned respectively to the respective RX protocol machine.

2. The subscriber station of claim 1, further comprising another control device, wherein the communication control device further includes:
 a comparator configured to compare data of the registers; and
 a receive memory configured to store valid data of one of the registers if a check based on a message identifier included in the received message was successful, and to forward the valid data to an interface to the other control device.

3. The subscriber station of claim 1, wherein:
 the communication control device is configured to hold additional parameter data sets and associated error counters; and
 each of the at least two RX protocol machines is configured to exchange its respective bit timing parameter data set for one of the additional parameter data sets based on the respective evaluation results, and thereby select the respective associated error counter.

4. The subscriber station of claim 1, wherein the communication control device is configured to hold:
 a first bit timing parameter data set for a first phase in which all subscriber stations can transmit simultaneously to the bus line of the bus system; and
 a second bit timing parameter data set for a second phase in which an exclusive, collision-free subscriber station access to the bus line of the bus system is ensured.

5. The subscriber station of claim 1, wherein the communication control device is configured to:
   replace errored pieces of data that are stored in a first of the registers with valid pieces of data that are stored in a second of the registers; and
   replace the bit timing parameter data set for the RX protocol machine assigned to the first register, with the data set that is used by the RX protocol machine that is assigned to the second register and that has received the valid pieces of data.

6. The subscriber station of claim 1, wherein, even after the communication control device having received one or more messages, the communication control device is configured to wait until a valid message has been received before a first sending of a message.

7. The subscriber station of claim 1, further comprising a second communication control device, wherein the bus line includes a first bus line and a second bus line, each of the communication control devices being connected to a respective one of the bus lines and fixedly including a respective RX protocol machine and respective associated register to which the associated RX protocol machine writes the result of its data extraction, the subscriber station including at least two additional non-fixedly assigned RX protocol machines each having a register to which the respective RX protocol machine writes the result of its data extraction, the at least two additional RX protocol machines being variably assignable to the first and second bus lines.

8. The subscriber station of claim 1, wherein the communication control device is configured to check whether the received message is intended for the subscriber station, and, in a case of an error, send an error message for the received message only if the received message is intended for the subscriber station.

9. A bus system comprising:
   a bus line to which an exclusive, collision-free subscriber station access is ensured at least at times; and
   at least two subscriber stations that are connected to one another via the bus line in such a way that they can communicate with one another, wherein at least one of the at least two subscriber stations includes a communication control device that includes at least two RX protocol machines configured to:
      for a same message that was received by the subscriber station via the bus system and from at least one additional subscriber station of the bus system, use different respective bit timing parameter data sets to extract data of the message; and
      write a respective result of the extraction by the respective RX protocol machine to a respective register assigned respectively to the respective RX protocol machine.

10. A method for increasing a data rate of a bus system in which at least at times an exclusive, collision-free subscriber station access to a bus line of the bus system is ensured, the method comprising:
   evaluating, with a communication control device of a first subscriber station, a message that was received, via the bus system, by at least one second subscriber station of the bus system, wherein the communication control device includes at least two RX protocol machines that are configured to:
      for a same message that was received by the subscriber station via the bus system and from at least one additional subscriber station of the bus system, use different respective bit timing parameter data sets to extract data of the message; and
      write a respective result of the extraction by the respective RX protocol machine to a respective register assigned respectively to the respective RX protocol machine.

* * * * *